E. KLAHN.
FLUID DRIVEN MOTOR.
APPLICATION FILED AUG. 3, 1914.
1,263,325.
Patented Apr. 16, 1918.
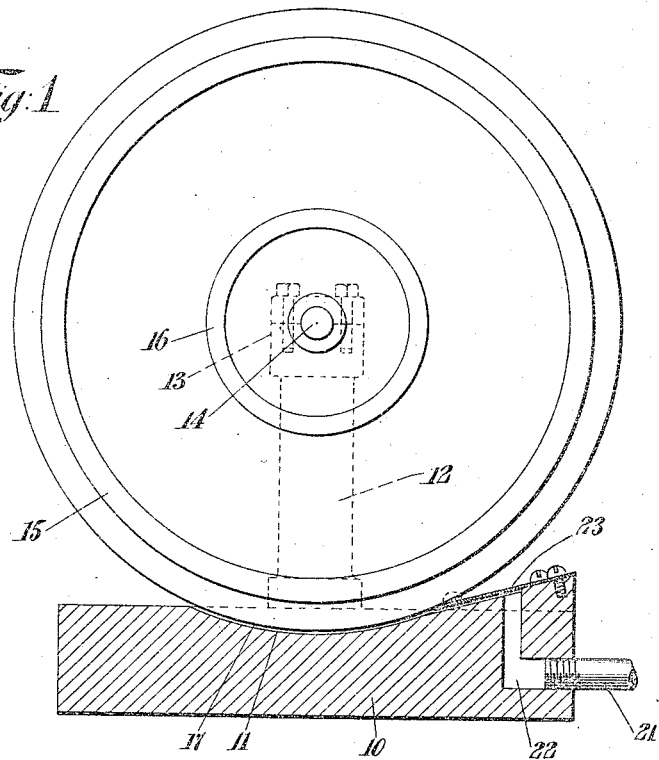
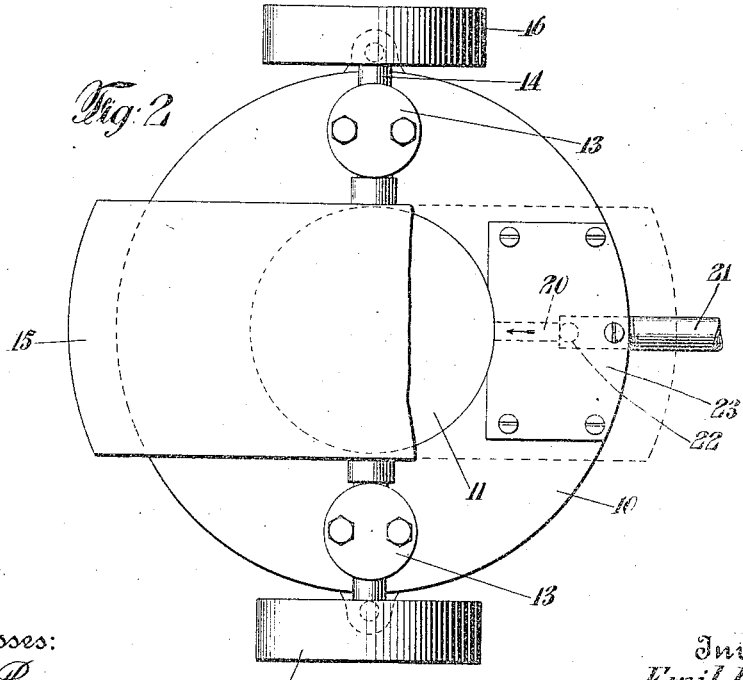
Witnesses:
John E. Prager
A. Worden Gibbs
Inventor
Emil Klahn
By his Attorney
Fred'k F. Schuetz

UNITED STATES PATENT OFFICE.

EMIL KLAHN, OF LIVINGSTON, NEW JERSEY.

FLUID-DRIVEN MOTOR.

1,263,325.  Specification of Letters Patent.  Patented Apr. 16, 1918.

Application filed August 3, 1914. Serial No. 854,864.

*To all whom it may concern:*

Be it known that I, EMIL KLAHN, a citizen of the United States, and a resident of Livingston, in the county of Essex and State of New Jersey, have invented certain new and useful Improvements in Fluid-Driven Motors, of which the following is a specification.

The invention relates to motors, more particularly to fluid driven rotary motors.

It has for its object to effect by means of a fluid directed to a suitably mounted mass, the rotation of said mass without the use of buckets, blades, and the like heretofore employed, and whereby a smooth action is obtained in that practically all vibration is eliminated. The motor is particularly suitable for use in gyroscopic apparatus; and this adaptation thereof is shown in a copending application filed by me simultaneously with the present application, but wherein no specific claim is made to the motor itself.

The nature of the invention will be best understood when described in connection with the accompanying drawings, in which—

Figure 1 is an elevation, partly in section, of the improved motor; and Fig. 2 is a plan thereof, with a portion of the rotatable or spinning mass broken away.

Similar characters of reference designate corresponding parts throughout the several views.

Referring to the drawings, 10 designates a suitable base, the upper surface of which is provided with a depression or cavity 11, herein shown as spherical, but which may be bounded by any other surface of revolution. Suitable standards 12 extend upwardly from base 10 and support in bearings 13 a shaft 14 of a rotatable or spinning mass 15, the shaft being provided, for example, with pulleys 16 from which power may be taken. The periphery of mass 15 is perfectly smooth and its curvature corresponds to that of the cavity 11 in the present instance, spherical; and the extent of said cavity surface may be varied to suit the different applications of the apparatus, the width of same, however, being preferably less than the width of the wheel. The said mass 15, moreover, is so mounted with respect to the base member 10 as to leave a passage-way 17 between the periphery of the said rotating mass and the surface of cavity 11, that is to say, the radius of curvature of the former is slightly less than the radius of curvature of the latter, it being understood that the base member 10 and the mass 15 are concentrically mounted. The exact difference between the radii for best results may be determined by computation and trial.

In order to effect the rotation of said mass, the actuating fluid (air) is directed thereto, at one side of the cavity 11 and in the direction of spin, through a nozzle or duct 20 preferably flat. The said nozzle is connected with a suitable source (not shown) of air under the desired pressure through a pipe 21 communicating with a duct 22 in the base 10.

The upper surface of the base 10 at the fluid end may be inclined, as shown, and the nozzle 20 formed therein and covered by means of a plate 23 secured thereto; or, the nozzle may be formed in any other suitable manner. In any case, it terminates substantially at a tangent to the surface of the cavity 11, directly into the same a thin band of the fluid; and of which there will not be an appreciable lateral flaring as it passes through the passage-way 17. By having the coöperating portion of the base member 10 entirely below the center of rotation of the spinning mass 15, the fluid, in passing through passageway 17, has the effect of simultaneously counteracting the weight of the said mass 15 and of imparting its velocity to the same, thereby rendering the apparatus especially suitable for use as a gyroscope. It is to be noted, also, that the passageway 17 is open throughout to the atmosphere, thus insuring against any reactive forces being set up, and which would be detrimental to the proper action of the spinning mass 15, particularly should the same be utilized as a gyroscope.

I claim:—

1. In apparatus of the character described: a rotatable mass of smooth periphery; means to support the same having a continuous surface parallel to the periphery of said mass and forming with same, over a portion of same only, a passageway open throughout to the atmosphere; and means to introduce a stream of fluid into said passageway.

2. In apparatus of the character described: a rotatable, spherical mass; a member coöperating therewith and having a spherical cavity to provide a passageway; and means to direct a stream of fluid therein.

3. A fluid driven motor, comprising: a suitably mounted rotatable mass having a smooth periphery; a member coöperating with a portion thereof only and of similar curvature to provide a passage-way open throughout to the atmosphere; and means to direct a stream of fluid therein.

4. A fluid driven motor, comprising: a suitably mounted rotatable mass having a smooth periphery; a member coöperating with a portion extending below its center of rotation only and of similar curvature to provide a passage-way open throughout to the atmosphere; and means to direct a stream of fluid therein.

5. A fluid driven motor, comprising: a suitably mounted rotatable mass consisting of a portion of a sphere; a member coöperating therewith and having a spherical cavity to provide a passage-way; and means to direct a stream of fluid therein.

6. A fluid driven motor, comprising: a base member provided with a spherical cavity; suitable standards extending from said base member; a rotatable mass supported thereby and consisting of a portion of a sphere and fitting concentrically within said cavity to provide a passageway; and means to direct a stream of fluid in the said passageway.

7. A fluid driven motor, comprising: a base member provided with a spherical cavity; suitable standards extending from said base member; a rotatable mass supported thereby and consisting of a portion of a sphere, fitting concentrically within said cavity and having a radius of curvature less than that of the said cavity to provide a passage-way; and means to direct a stream of fluid into said passage-way.

8. A fluid driven motor, comprising: a base member provided with a spherical cavity; suitable standards extending from said base member; a shaft mounted on said standards, and power transmitting means thereon; a rotatable mass supported by said shaft and consisting of a portion of a sphere, fitting concentrically within said cavity and having a radius of curvature less than that of the said cavity to provide a passage-way; and means to direct a band of fluid tangentially into said passage-way.

Signed at New York, in the county of New York, and State of New York, this 31st day of July, A. D. 1914.

EMIL KLAHN.

Witnesses:
FRED'K F. SCHUETZ,
ALEXANDER S. CHESSIN.

Copies of this patent may be obtained for five cents each, by addressing the "Commissioner of Patents, Washington, D. C."